(12) United States Patent
Van Tilburg et al.

(10) Patent No.: US 10,617,093 B2
(45) Date of Patent: Apr. 14, 2020

(54) MILKING DEVICE

(71) Applicant: LELY PATENT N.V., Maassluis (NL)

(72) Inventors: Ruben Alexander Van Tilburg, Maassluis (NL); Dirk Dijkshoorn, Maassluis (NL); Mattheus Jacob De Hullu, Maassluis (NL)

(73) Assignee: LELY PATENT N.V., Maassluis (NL)

( * ) Notice: Subject to any disclaimer, the term of this patent is extended or adjusted under 35 U.S.C. 154(b) by 68 days.

(21) Appl. No.: 15/302,654

(22) PCT Filed: Apr. 28, 2015

(86) PCT No.: PCT/NL2015/050283
§ 371 (c)(1),
(2) Date: Oct. 7, 2016

(87) PCT Pub. No.: WO2015/170971
PCT Pub. Date: Nov. 12, 2015

(65) Prior Publication Data
US 2017/0027128 A1    Feb. 2, 2017

(30) Foreign Application Priority Data
May 9, 2014 (NL) ...................................... 2012789

(51) Int. Cl.
*A01J 7/02* (2006.01)
*A01J 5/007* (2006.01)
(Continued)

(52) U.S. Cl.
CPC ............... *A01J 7/022* (2013.01); *A01J 5/007* (2013.01); *A01J 5/044* (2013.01); *A01J 9/00* (2013.01); *B08B 3/10* (2013.01); *B08B 9/0325* (2013.01)

(58) Field of Classification Search
CPC .. A01J 7/022; A01J 5/044; A01J 5/007; A01J 9/00; A01J 7/02; A01J 7/027; B08B 9/0325; B08B 3/10
(Continued)

(56) References Cited

U.S. PATENT DOCUMENTS 5,085,172 A * 2/1992 Borgman .............. A01J 5/0136
119/14.09
5,651,329 A * 7/1997 van den Berg ......... A01J 5/007
119/14.02
(Continued)

FOREIGN PATENT DOCUMENTS

EP           0 679 331 A2    11/1995
WO    WO 2013/081534 A1     6/2013

*Primary Examiner* — Nadine G Norton
*Assistant Examiner* — Christopher Remavege
(74) *Attorney, Agent, or Firm* — Birch, Stewart, Kolasch & Birch, LLP

(57) ABSTRACT

A milking system includes several milking devices, each having a milk-carrying part, a temporary milk storage vessel, a milk pipe system, a milk storage tank, and a main milk pipe, which connects the temporary milk storage vessel to the milk storage tank. The milking system includes a first cleaning device having at least one first cleaning liquid supply and at least a pump, which cleaning device is configured to clean at least the milk-carrying part of at least one milking device and a part of the milk pipe system which connects the milk-carrying part to the temporary milk storage vessel, by transferring cleaning liquid from the cleaning liquid supply through at least the milk-carrying part of the at least one milking device and through said part of the milk pipe system to the temporary milk storage vessel by pumping. The temporary milk storage vessel includes a main pump for transferring liquid from the temporary milk storage vessel through the main milk pipe in the direction of the milk storage tank. The milking system includes a second, (Continued)

Figure 1:
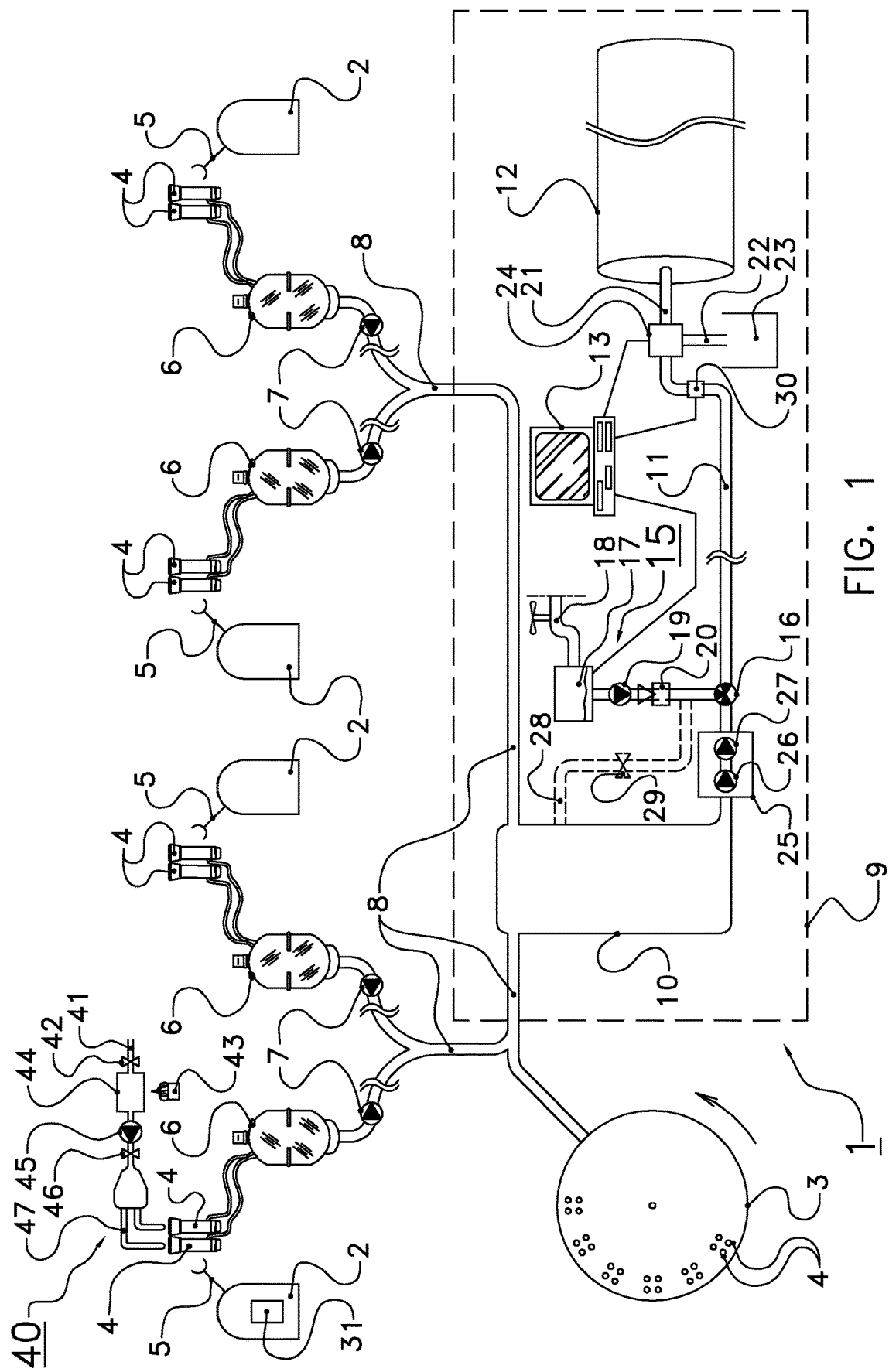

additional cleaning device with at least one second, additional cleaning liquid supply, which second cleaning device is configured to supply additional cleaning liquid from the second cleaning liquid supply in a direction of flow from the temporary milk storage vessel towards the main milk pipe. The second cleaning liquid supply is situated downstream of at least each of the milking devices, viewed in said direction of flow.

20 Claims, 2 Drawing Sheets

(51) Int. Cl.
*A01J 9/00* (2006.01)
*A01J 5/04* (2006.01)
*B08B 3/10* (2006.01)
*B08B 9/032* (2006.01)

(58) Field of Classification Search
USPC .......... 134/18, 22.1, 22.11–22.19, 34, 100.1, 134/115 R, 166 C, 57 R, 58 R; 119/14.02, 14.08, 14.18
See application file for complete search history.

(56) References Cited

U.S. PATENT DOCUMENTS

| | | | | |
|---|---|---|---|---|
| 5,762,020 | A * | 6/1998 | van der Lely | A01J 5/0175 119/14.08 |
| 5,896,828 | A * | 4/1999 | Kronschnabel | A01J 7/022 119/14.02 |
| 5,913,281 | A * | 6/1999 | van den Berg | A01J 7/025 119/14.02 |
| 6,089,242 | A * | 7/2000 | Buck | A01J 7/022 119/14.18 |
| 6,561,126 | B2 * | 5/2003 | Forsen | A01J 7/025 119/14.02 |
| 6,619,227 | B1 * | 9/2003 | Berger | A01J 7/022 119/14.08 |
| 7,143,718 | B2 * | 12/2006 | Bosma | A01J 5/0175 119/14.02 |
| 7,757,634 | B2 * | 7/2010 | Croft | A01J 7/00 119/14.01 |
| 8,371,243 | B2 * | 2/2013 | Harty, Jr. | A01J 7/022 119/14.02 |
| 8,381,680 | B2 * | 2/2013 | Westman | A01J 7/022 119/14.02 |
| 2002/0092474 | A1 * | 7/2002 | van der Lely | A01J 7/022 119/14.02 |
| 2011/0041770 | A1 * | 2/2011 | Westman | A01J 7/022 119/14.15 |
| 2011/0120378 | A1 * | 5/2011 | Johannesson | A01J 5/045 119/14.18 |
| 2011/0168097 | A1 * | 7/2011 | Kristensen | A01J 7/022 119/14.03 |
| 2011/0297188 | A1 * | 12/2011 | Bosma | A01J 7/022 134/22.11 |

* cited by examiner

MILKING DEVICE

The present invention relates to a milking system for use on a dairy farm, wherein the milking system comprises several milking devices, each having a milk-carrying part, a temporary milk storage vessel, a milk pipe system which connects the temporary milk storage vessel to each of the milking devices, a milk storage tank, and a main milk pipe, which connects the temporary milk storage vessel to the milk storage tank.

Such a milking system is known per se, in particular for large farms having several milking systems. In this case, milk from a milking operation is initially collected in a(n optional) milk jar near the milking device itself, then transferred to a temporary milk storage vessel, being a buffer vessel, from where the milk is pumped to the final milk tank. In particular for large farms, such a buffer vessel is desirable because the distance between the milking devices and the milk storage tank may be quite significant, up to a few hundred meters. This increases the resistance the milk experiences in the pipes, resulting in the need for stronger pumps in order to be able to pump the milk as far as the milk storage tank. Providing such strong pumps at the milking devices themselves is not only very costly, but could also cause damage to the milk, in particular the fat globules, when pumping milk from a single milking operation. By providing the buffer vessel, it becomes possible to fit it with a special pump, as a result of which the pumping de facto becomes a two-stage system.

The milking system furthermore has to be cleaned on a regular basis. To this end, a cleaning device is provided with at least one cleaning liquid supply and at least a pump. The cleaning liquid supply can supply cleaning liquid to the milking system, which cleaning liquid can then be pumped through the milking system by the pump. In many cases, hot water is used as the cleaning liquid.

A problem of the known milking devices is the fact that the cleaning action cannot be sufficiently controlled by means of the cleaning liquid, for example hot water. Since milking systems have to be cleaned and disinfected in order to provide milk for consumption of good quality, this lack of control is undesirable.

It is an object of the invention to improve the known milking systems in such a way that an improved control of the cleaning and/or disinfection process is achieved.

This object is achieved by the invention by means of a milking system according to claim 1, in particular a milking system for use on a dairy farm, wherein the milking system comprises several milking devices, each having a milk-carrying part, a temporary milk storage vessel, a milk pipe system which connects the temporary milk storage vessel to each of the milking devices, a milk storage tank, and a main milk pipe, which connects the temporary milk storage vessel to the milk storage tank, wherein the milking system furthermore comprises a first cleaning device having at least one first cleaning liquid supply and at least a pump, which cleaning device is configured to clean at least the milk-carrying part of at least one milking device and a part of the milk pipe system which connects the milk-carrying part to the temporary milk storage vessel, by transferring cleaning liquid from the cleaning liquid supply through at least the milk-carrying part of the at least one milking device and through said part of the milk pipe system to the temporary milk storage vessel by pumping, wherein the temporary milk storage vessel comprises a main pump for transferring liquid from the temporary milk storage vessel through the main milk pipe in the direction of the milk storage tank, wherein the milking system furthermore comprises a second, additional cleaning device with at least one second, additional cleaning liquid supply, which second cleaning device is configured to supply additional cleaning liquid from the second cleaning liquid supply in a direction of flow from the temporary milk storage vessel towards the main milk pipe, wherein the second cleaning liquid supply is situated downstream of at least each of the milking devices, viewed in said direction of flow.

The idea behind the invention is that various ambient influences, and in particular the possibly long main milk pipe, may have a not altogether predictable effect on the cleaning of, in particular, those parts which are situated further downstream, in particular the main milk pipe. This may be the result of weather conditions, such as temperature and wind, or also, for example, of subsequent extension of the milking system with new milking devices. Even when a cleaning device with its own cleaning liquid supply is provided for each milking device, it is not possible to ensure that the combined supply of cleaning liquid by all milking devices is sufficient to clean the entire milking system. Therefore, an additional cleaning liquid supply may be provided centrally in the form of the second cleaning liquid supply. This can then react centrally to, for example, changed circumstances. This offers the advantage that the milking devices and their optional cleaning device themselves can remain standard and do not all have to react to changed circumstances.

The present invention mainly offers advantages with milking systems which are used for voluntary free animal traffic, wherein the dairy animal, in particular cows, sheep, goats, determine themselves when to visit the milking device. Obviously, in this case, milking will preferably take place in an automated, robotized manner, so that the milking devices are preferably robotic milking devices. After all, with such free animal traffic, it is difficult to predict when the best time is for cleaning, since animals could be milked at any point during the day, in contrast to forced animal traffic, in which animals are driven to milking devices in groups.

The milk pipe system comprises one or more milk pipes, wherein each individual milking device has at least one milk pipe which runs from the respective milking device to a temporary milk storage vessel. In this case, it is possible for several milk pipes from different milking devices to converge into a single combined milk pipe which then ends in the temporary milk storage vessel or in yet another combined milk sub-line, etc. It is expressly stated here that the temporary milk storage vessel, i.e. the buffer vessel, is not identical with a so-called milk jar, which is often provided with a milking device. A milk jar only stores milk from a single milking operation and serves, for example, as a buffer to pass milk to the correct destination, and as an air separator. By contrast, the temporary milk storage vessel according to the present invention is a vessel for storing milk from several milking operations, inter alia to limit the number of pumping movements, and to have a more manageable amount of milk to pump through long main milk pipes, such as can be found in large farms. All this is revealed by the size of a milk jar compared to that of a temporary milk storage vessel, which is at most 50 liters and at least 250 liters and, in practice, often between 500 and 1000 liters, respectively.

It should be noted here that the term "cleaning" of, in particular, the milking devices and/or the entire milking system is understood to mean cleaning milk-carrying parts. External cleaning of any part of the milking system is not aimed at in this case. Here, the milk-carrying parts comprise in particular milking cups, short milk pipes, optionally a milking claw, a milk jar which is often, but not always provided, the milk pipe system, and then the temporary milk storage vessel and the main milk pipe. The milk storage tank is slightly outside this context because, in principle, it can only be cleaned when the entire milking system is empty. Nevertheless, the advantages of the invention can also be applied to cleaning the milk storage tank of the milking system.

With the present invention, the first cleaning device comprises at least one first cleaning liquid supply and at least a pump. In this case, the cleaning device may comprise several subcleaning devices, for example one for each milking device, or for example also one for every two or more milking devices. This applies to both the cleaning liquid supply and to the pump. In most cases, however, one cleaning liquid-supply and one pump will be provided for each milking device. Such a cleaning device for each milking device will obviously be configured to clean the milk-carrying parts running from the milking cups of the respective milking device up to the milk storage tank, without necessarily incorporating any branches.

The temporary milk storage vessel comprises a main pump, which may be provided near, such as on the underside of, the temporary milk storage vessel, or also in the main milk pipe. In both cases, the main pump will take in liquid and pump it into the main milk pipe, in which case the main pump is preferably placed in such a manner that it can pump the temporary milk storage vessel completely dry. In this case, liquid may actively be sucked up by the main pump or also flow into the main pump, such as on account of the force of gravity.

According to the invention, viewed in the intended direction of flow of for example milk, the second cleaning liquid supply is situated downstream of at least each of the milking devices. This is understood to mean the following. In this case, a milking device is a milking device such as is in principle separately available from the supplier. The location where a new milking device can be connected to an existing milking system is the natural boundary between the milking devices and the milk pipe system. In this case, the second cleaning liquid supply is situated in the milk pipe system or further downstream. If there is no clear boundary between the milking devices and the milk pipe system, this feature is to be explained as follows. Every milking device has a milk-collecting claw or a milk jar or both. In this case, viewed in the intended milk discharge direction, the second cleaning liquid supply is situated at least halfway along the distance between the milking claw or the milk jar, on the one hand, and the temporary milk storage vessel, on the other hand. Obviously, the second cleaning liquid supply may in all cases also be situated further downstream. The point in this case is that the cleaning liquid to be supplied by the second cleaning liquid supply can clean that part of the milking system which is situated further downstream in one go. Incidentally, it should be noted here that it is also possible to provide several second cleaning liquid supplies, in which case the second cleaning liquid supplies is provided downstream of each of the milking devices.

The cleaning action of the cleaning liquid supplied by the first cleaning device will decrease as it flows further downstream. In particular, at the end of the main milk pipe this may become too inefficient to ensure good cleaning of that part of the milking system. In this case, consideration may be given to hot water which has dropped below a threshold or a cleaning activity such as a concentration or pH value of the cleaning liquid, etc. According to the invention, the second cleaning liquid supply is provided in order to be able to address this in one go, so that no modifications have to be made for each milking device.

Particular embodiments are defined in the dependent claims, as well as in the text below.

In embodiments, at least one second cleaning liquid supply is situated downstream of said milk pipe system, in particular in the temporary milk storage vessel. In this case, viewed in the intended discharge direction of the milk, at least one second cleaning liquid supply is thus situated in the earliest position, namely in the temporary milk storage vessel. The second cleaning liquid supply is then, for example, directly in the temporary milk storage vessel, such as from above. This is not only a suitable location due to the presence of more space in order to produce such a supply, but also, the cleaning action in the upstream part of the milking system can be ensured in nearly all cases, since this part is usually relatively short, as it only comprises the milk pipe system and the milk-carrying parts of the milking devices.

In embodiments, at least one second cleaning liquid supply is situated in the main milk pipe, downstream of the temporary milk storage vessel. In these embodiments, the second cleaning liquid supply is provided still further downstream. In fact, these embodiments amount to a better guarantee that the most critical part of the milking system can be cleaned, since the cleaning action furthest downstream is most difficult to ensure. In addition, in these embodiments it is possible to provide a cleaning liquid return pipe to, in particular, the temporary milk storage vessel. This means that a branch from the main milk pipe returns to the temporary milk storage vessel, as a result of which cleaning liquid can even circulate in order thus to be able to clean the temporary milk storage vessel more thoroughly. The return pipe is then preferably provided with a valve, in order not to cause any undesired circulation when discharging milk. In this case, viewed in the intended milk discharge direction, the return pipe is situated upstream from the second cleaning liquid supply(-ies). This prevents the second cleaning liquid from being circulated, as a result of which unnecessary heating of the temporary milk storage vessel takes place.

In embodiments, each of the several milking devices has a dedicated first cleaning device or at least a dedicated first cleaning liquid supply. In these embodiments, a significant advantage emerges which has already been mentioned above. Even if there are many, for example eight, ten or even more, first cleaning liquid supplies or even as many first cleaning devices, only one additional cleaning device has to be looked at in order to monitor cleaning of the main milk pipe. In this case, it is assumed that cleaning of the milk-carrying parts upstream of the temporary milk storage vessel is sufficiently ensured under all circumstances. After all, the length of the pipe system between milking device and temporary milk storage vessel will in many cases not vary greatly between milking systems. Thus, it is in this case sufficient for a fixed setting for the first cleaning devices or optionally set once for the milking system. In that case, the only real variable is the main milk pipe which is sometimes very long and the cleaning of which is ensured by means of the additional, second cleaning device.

In embodiments, the first cleaning device comprises a first heating device for heating cleaning liquid to be supplied via the first cleaning liquid supply and the second cleaning device comprises a second, additional heating device for heating cleaning liquid to be supplied via the second cleaning liquid supply. In these embodiments, heating devices, such as in particular boilers, are provided for heating the first cleaning liquid. These are operatively provided in the first cleaning device and may comprise separate boilers or the like for each milking device, or one heating device for every two or more milking devices. As is the case with all other embodiments of the present invention, the cleaning liquid here may be water, optionally provided with additives. Obviously, other cleaning liquids are not excluded. The second heating device then also comprises, for example, a boiler. It should be noted that a boiler can more readily ensure a well-controlled temperature of the cleaning liquid than, for example a burner or the like. In addition, both the first and the second cleaning device may comprise one or more dedicated cleaning liquid supplies, such as buffer supplies. In the case of a boiler, such supplies are intrinsic.

In an embodiment, the milking system comprises a monitoring device configured to monitor a cleaning criterion and to generate a control signal based on the monitoring of the cleaning criterion, wherein the second cleaning device comprises a control unit which is operatively connected to the monitoring device and which controls the second cleaning device on the basis of the control signal. In these embodiments, the monitoring device is or comprises one or more sensors which measure the one or more parameter values of cleaning liquid in the milking system. The monitoring device generates a control signal on the basis of the measured parameter value(s) by, for example, comparing these value(s) to a threshold value or the like in accordance with a predetermined cleaning criterion. The control unit in the second cleaning device can then control this second cleaning device on the basis of the control signal, such as supplying second cleaning liquid if the control signal indicates that the predetermined cleaning criterion is not being met.

In embodiments, the monitoring device comprises a temperature gauge which is configured to repeatedly measure a temperature of liquid in the main milk pipe, in particular near the milk storage tank. In these embodiments, the cleaning liquid is in particular hot water and the parameter value relates to the temperature of the cleaning liquid, in particular in the main milk pipe, more in particular near the milk storage tank. In this case, the term "near" is understood to mean that the temperature is essentially measured at the connection between the main milk pipe and milk storage tank, such as within the last tenth portion of the main milk pipe. After all, that is where the temperature will be at its lowest and the risk that the cleaning criterion has not been met everywhere is greatest. Such a predetermined cleaning criterion may comprise many things, as will be explained below in more detail. Incidentally, other cleaning liquids and other parameter values are also possible, such as a pH value or a concentration of a cleaning agent in the cleaning liquid.

In embodiments, the cleaning criterion comprises that the measured temperature is above a predetermined threshold value for at least a predetermined time period. Such a criterion is often used in connection with cleaning or disinfection. Such a time period may in principle be uninterrupted, provided the interruption(s) do not last too long. In particular, the time period is uninterrupted, so that the correct disinfection can be ensured. The threshold value can be chosen freely within certain limits and may, for example, have been determined from empirical tests. Many threshold values which are used are at a temperature of 80° C. or more, with an associated predetermined time period. In this case, the predetermined time period may be shorter if the threshold value is higher.

In embodiments, the control unit is configured to supply, by means of the second cleaning device, additional cleaning liquid in an amount and/or at a temperature which is/are dependent on said measured temperature of the liquid, in particular during a preceding cleaning action. With these embodiments, the second cleaning device is configured to supply additional cleaning liquid in such an amount and/or at such a temperature that the predetermined criterion is still being met for the cleaning operation as a whole. In this case, it is for example possible to "repeat" the cleaning operation, so that only the additional cleaning liquid causes the temperature to rise above the threshold value, or the like. Obviously, in most cases, the additional, second cleaning liquid will only have to serve as an addition to the cleaning by the first cleaning liquid and therefore the amount and/or temperature may also be smaller/lower. These significant embodiments make it possible to adjust the second cleaning operation in a dynamic way. In this case, it should be noted that the cleaning operation may take a relatively long time, during which time the milking devices cannot be used for milking, or only with difficulty. In order to limit such "down time", it is in particular possible not to use the amount and/or temperature of the second cleaning liquid resulting from the measured parameter values until a subsequent cleaning operation. In other words, a first cleaning operation is for example performed using only the first cleaning device and the first cleaning liquid, during which the parameter values are measured and it is determined how much second cleaning liquid would have to be supplied in order for the cleaning operation to meet the predetermined criterion. Then, during a subsequent cleaning operation, the determined amount of second cleaning liquid is supplied by the second cleaning device while the cleaning operation is taking place, if desired at the temperature which may optionally also have been determined. It should be noted that in all instances where the term temperature is used, the phrase concentration of a cleaning agent or the like may for example also be used.

In the abovementioned way, the cleaning operation can be carried out virtually as quickly as if there were no second cleaning device. In addition, it is possible to measure one or more ambient parameters, such as ambient temperature, wind speed, degree of humidity, etc., in order to set on the basis thereof, also the amount of second cleaning liquid, and one or more other parameters thereof, such as temperature.

The invention also relates to a method for cleaning a milking system on a dairy farm according to claim 9, in particular wherein the milking system comprises several milking devices, a temporary milk storage vessel, which is connected to each of the milking devices by means of a milk pipe system, a milk storage tank, which is connected to the temporary milk storage vessel by means of a main milk pipe, wherein the method comprises supplying first cleaning liquid to and through one or more, and in particular each of the milking devices and at least a part of the milk pipe system, pumping the first cleaning liquid into the temporary milk storage vessel by means of one or more pumps, in particular one pump for each milking device, and supplying second, additional cleaning liquid to the milking system, substantially downstream of each of the milk pipes, in particular directly to the temporary milk storage vessel and/or directly to the main milk pipe. In particular, this method is carried out on and using a milking system according to the invention. The advantages of the method have already been mentioned in the explanation of the milking system according to the invention. Therefore, the further explanation of this method and of particular embodiments given below will be concise.

In embodiments, the method comprises measuring a value of a property of at least the first cleaning liquid, in particular near a connection between the main milk pipe and the milk storage tank, and the supply of second additional cleaning liquid takes place according to a criterion in connection with the measured value. Just as with the milking system, "near" in this case means close to the connection, for example within a tenth of the length of the main milk pipe as a distance to the milk storage tank. Incidentally, the main milk pipe comprises a valve system near the connection with the milk storage tank, and in particular downstream of the position of the sensor which measures the value of the property in order to be able to discharge the cleaning liquid flowing to the milk storage tank to a sewer or the like. Such a valve system is known per se and will not be explained here in more detail.

In embodiments, the criterion comprises that the measured value reaches a predetermined threshold value, in particular during a predetermined, in particular uninterrupted, time period. In this case, reaching a predetermined threshold value is understood to mean that the measured value equals this threshold value, or exceeds it, if it is a highest threshold value, or falls below it if it is a lowest threshold value. For example, in the case of temperature as a property of the liquid, the criterion is that the measured temperature exceeds a threshold temperature during, in particular, a predetermined time period.

In embodiments, the property comprises a temperature of at least the first cleaning liquid. This property/parameter has already been mentioned during the explanation of the milking system. It should also be noted here that other properties, such as a concentration of a cleaning agent or the like, are also possible.

In embodiments, the second cleaning liquid is supplied in such an amount and/or at such a temperature that the criterion is met for the combination of first cleaning liquid and second cleaning liquid.

In embodiments, the method comprises performing a cleaning cycle repeatedly but with, in each case, an interval, which cleaning cycle comprises supplying first cleaning liquid through one or more, and preferably all, milking devices, and the optional supply of second cleaning liquid, wherein the amount and/or temperature of the second cleaning liquid to be supplied during a cleaning cycle is determined by means of the measured values during a, in particular directly, preceding cycle. In this case, the "optional" supply of second cleaning liquid depends on a criterion, as has been explained above or with the milking system. In these embodiments, settings are determined from the measured values and are used during a subsequent cleaning cycle, so that each cleaning cycle can be performed in as short a time period as possible.

Figure 2A:
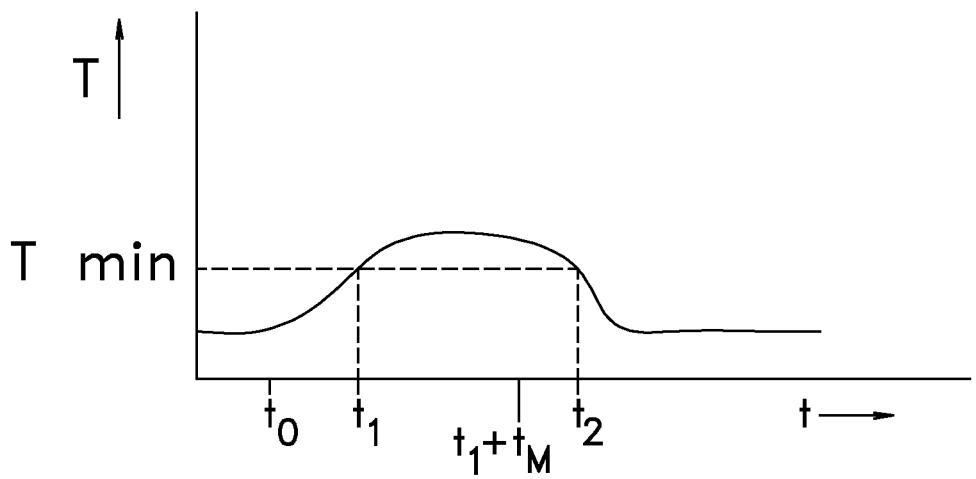
Figure 2B:
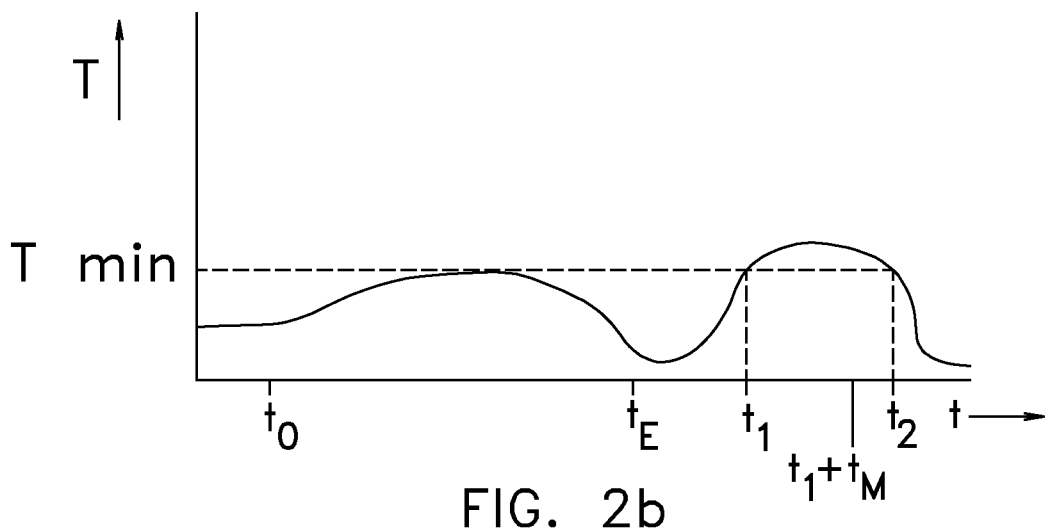
Figure 2C:
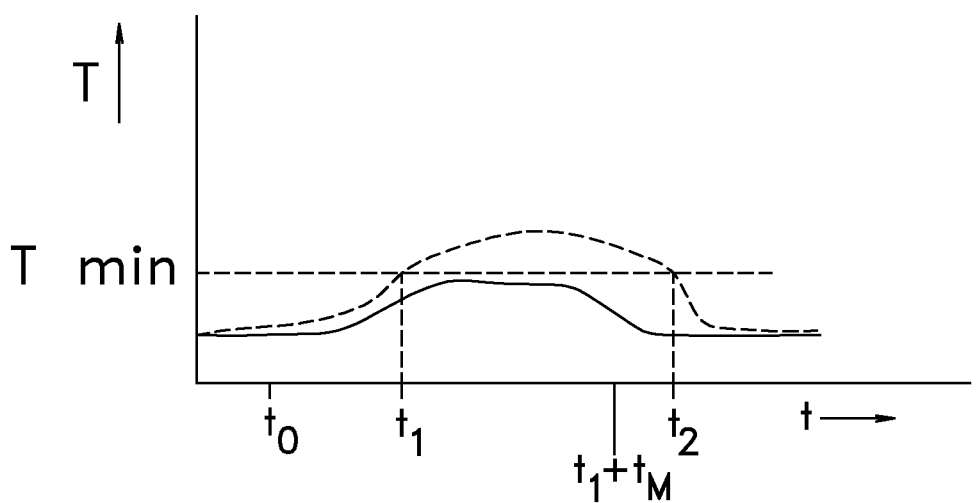

The invention will now be explained in more detail with reference to the drawing, which shows some non-limiting illustrative embodiments, and in which:

FIG. 1 shows a highly diagrammatical view of a milking system 1 according to the invention, and FIGS. 2a, 2b and 2c show diagrammatic views of the temperature measured by the sensor 30 as a function of time.

FIG. 1 shows a highly diagrammatical view of a milking system 1 according to the invention. Here, the milking system 1 also comprises a carrousel 3 in addition to four milking robot devices 2. Each milking robot device 2 has milking cups 4 and a gripper arm 5 in order to attach the milking cups to the teats of a dairy animal. In addition, there is in each case provided a milk jar 6 for collecting the milk from a milking operation and a milk pump 7 for pumping the milk through the milk pipe 8 to a milk storage system 9, comprising a temporary milk storage vessel 10 which is connected to a milk tank 12 via a main milk pipe 11.

Reference numeral 13 denotes a control unit and reference numeral 15 denotes a pressurized liquid supply, which is connected to the main milk pipe 11 via a second selection device 16, and a boiler 17, a water pipe supply 18, a pump 19 and a flow meter 20.

In addition, reference numeral 21 denotes a first discharge and reference numeral 22 denotes a second discharge to a waste receptacle 23, as well as a selection device 24.

Reference numeral 25 denotes a pump system comprising a first pump 26 and a second pump 27. Reference numeral 28 denotes an optional return pipe with a valve 29. Reference numeral 30 denotes a sensor.

Reference numeral 40 generally denotes a cleaning device with a cleaning liquid supply 41, a valve 42, a boiler comprising a heater 43 underneath a buffer vessel 44, and with a pump 45, a valve 46 and supply pipes 47.

In addition to a carrousel 3 comprising several milking stations with milking cups 4, the milking system 1 illustrated here also comprises four milking robot devices 2. It will be clear that the milking system may also only comprise a carrousel, or even several carrousels, or even only any number of milking robot devices, such as two, eight or sixteen, etc.

In addition, not all details which are non-relevant to the invention have been shown, such as milking stations at the milking robot devices, etc. Also, the cleaning device 40 is only shown with one milking robot device 2. It will be clear that these will be provided with or for each of the milking robot devices 2, although not necessarily separately in each case.

Each milking robot device 2 is configured to milk a dairy animal at a milking station (not shown). To this end, the milking robot device 2 attaches the milking cups 4 to the teats of the dairy animal by means of the gripper arm 5 or any other device suitable for this purpose. Here, only two milking cups 4 are shown, which is sufficient for a goat or the like. Cows require four milking cups. The milk which is milked using the milking cups 4 during each milking operation is collected in the milk jar 6. The milking robot device 2 is furthermore configured to determine whether the milk from the milking operation has to be transferred from the milk jar 6 to the milk tank 12 as milk for consumption. To this end, the milking robot device 2 here comprises features (not shown), such as a milk quality device or also a management system which can determine, for example on the basis of the detected animal identity, whether the milk is suitable or unsuitable for human consumption. If the milk is found to be unsuitable, a discharge (not shown) is provided here for the milk from the milk jar 6, such as to a sewer or a residual milk receptacle. If the milk is found to be suitable for human consumption, the milk pump 7 will pump it from the milk jar 6 into the milk pipe system 8. Subsequently, the milk will be collected in the milk storage system 9, which in this case comprises a temporary milk storage vessel 10.

The temporary milk storage vessel 10 receives milk from several milking operations and, for example, as shown here, milk from several milk jars and/or even from a carrousel 3. The volume of the temporary milk storage vessel 10 is therefore chosen accordingly and comprises, for example, several hundred liters.

If the temporary milk storage vessel 10 has been filled to a sufficient degree, the milk will be pumped from there to the milk tank 12 via the main milk pipe 11 by means of the pump system 25. All this is controlled by the control unit 13, which is only shown highly diagrammatically. The same is true for the illustrated connections between the control unit 13 and the various parts of the milking system 1 which are controlled by the control unit 13, which connections are here only shown in part and in a highly diagrammatical manner. It goes without saying that there is an operational connection between the control unit 13 and the controlled parts of the milking system 1 which may be wired or wireless.

After one or more milking operations, each milking device will be cleaned. For the following description, it will be assumed that the milking robot device 2 shown at the top left in the figure will be cleaned. Preferably, all milking devices, such as the milking robot devices 2 and the carrousel 3, will be cleaned in one cleaning operation, either in parallel or sequentially or in combination. If at least a second, parallel milk pipe system 8 is provided, it is even possible to simultaneously clean a subgroup of the milking devices and to continue milking using another subgroup of the milking devices. Obviously, a reversing device, such as a valve block, is then also provided in order to pass the milk from the respective subgroup of milking devices to the associated milk pipe system, but these details are outside the scope of the invention and will not be described further.

During cleaning of the milking robot device 2, cleaning liquid is passed through the milk-carrying part by means of the cleaning device 40. The milk-carrying part of the milking robot device 2 comprises at least the milking cups 4, the milk jar 6, the milk pump 7 and the part of the milk pipe system 8 between the milk pump 7 and the temporary milk storage vessel 10. Before the cleaning operation, cleaning liquid is supplied in the milking cups 4 via the supply lines 47. The cleaning liquid is supplied via the cleaning liquid supply 41, for example a storage vessel or water pipe connection. By opening the valve 42 at regular intervals, a supply of cleaning liquid is provided in a boiler comprising a buffer vessel 44 with a heater 43. The heater may be a burner, but is preferably an electrical heating. In the boiler, that is to say in the buffer vessel 44, cleaning liquid is heated to a desired temperature, such as 95° C. At the start of the cleaning operation, the heated cleaning liquid is passed through the supply pipes 47 to the milking cups 4 by means of the pump 45 and the valve 46 which is now open. From there, the cleaning liquid will then, optionally by means of additional pumping action by the milk pump 7, be pumped to the temporary milk storage vessel 10 through the milk pipe system 8. Cleaning liquid of all cleaned milking devices will be collected in the temporary milk storage vessel 10 and from there be pumped in the direction of the milk tank 12. This is effected, for example, by means of the pump system 25 which passes the collected cleaning liquid through the main milk pipe 11 using one or two pumps 26, 27. By means of the selection device 24, the cleaning liquid can then be discharged, for example to a waste liquid receptacle 23 or for example to a sewer. To this end, the control unit 13 will switch a valve or valve system in the selection device 24 and bring about the connection to the second discharge. Usually, that is to say when transferring milk by pumping, this selection device 24 will be in a different position and will have brought about a liquid connection between the main milk pipe 11 and the first discharge 21 to the milk tank 12.

It should be noted that the cleaning device 40 may also supply a cleaning liquid containing an additive such as a cleaning agent instead of heated cleaning liquid. However, in the present case, it is assumed that the liquid has been heated. With such a hot cleaning operation, it is desirable to meet a certain cleaning criterion, such as in particular exceeding a certain minimum temperature for a minimum, optionally uninterrupted, time.

When moving the cleaning liquid through the main milk pipe 11, it will slowly but surely cool down and thus have its lowest temperature near the second discharge 22. Therefore, the sensor 30 which monitors the quality of the cleaning liquid is provided near said second discharge 22. In this case, the sensor 30 is, for example, a thermometer which measures the temperature of the liquid or of the main milk pipe 11 itself. If the sensor 30 does not measure the desired minimum temperature or at least not for a minimum uninterrupted time period, then it is not possible to guarantee that in particular the last part of the main milk pipe 11 is cleaned sufficiently. If this is the case, the hot-cleaning operation may be supported by supplying additional heated cleaning liquid by means of the pressurized liquid supply 15.

The pressurized liquid supply 15 comprises a boiler 17 which is fed by a water pipe 18 or another cleaning liquid supply. By means of the pump 19, it is then possible to supply the liquid to the main milk pipe 11 via the second selection device 16. By supplying a sufficiently large amount and/or sufficiently heated additional cleaning liquid, it is still possible to ensure sufficiently good cleaning of in particular the main milk pipe 11.

The optional return pipe 28 allows cleaning liquid which has passed through the temporary milk storage vessel 10 to be returned thereto in order to clean the vessel once more. To this end, the connection to the main milk pipe 11 may be closed by for example the second selection device 16, so that the pump system 25 can pump liquid around. The connection of the return pipe 28 to the milk storage system 9 could also be situated at other locations. Furthermore, it should be noted that the pump system 25 here comprises a first pump 26 and a second pump 27. Thus, the pump system 25 may for example pump at various pump speeds, such as at a first pump speed provided by the first pump 26 for pumping milk, and a second, higher pump speed for pumping cleaning liquid by means of the second pump 27 or both pumps 26 and 27. This may also be achieved by means of a single, controlled pump.

FIGS. 2a, 2b and 2c show diagrammatic views of the temperature measured by the sensor 30 as a function of time.

FIG. 2a shows a cleaning cycle which satisfies the predetermined criterion that a minimum temperature $T_{min}$ has to be reached for at least a time period $t_M$. In the illustrated cleaning cycle, the cleaning operation starts at time $t_0$, after which the temperature starts to increase. At time $t_1$, the temperature $T_{min}$ is reached and remains higher than said temperature until time $t_2$. The time period from time $t_1$ to $t_2$ is longer than $t_M$, so that sufficiently good cleaning can be ensured.

FIG. 2b shows a cleaning operation which has initially had an insufficiently good cleaning effect and does not satisfy the criterion. The cleaning operation starts at time to, but in this case does not even reach the minimum temperature $T_{min}$ before the end of the actual cleaning operation at time $t_E$. This may be the case, for example, when the outside temperature is lower, so that the liquid cools down more in the milk pipe system 8, the temporary milk storage vessel 10 and the main milk pipe 11. Also, it is not inconceivable for one or more cleaning devices 40 to develop a failure, so that they cannot provide the correct amount of heated cleaning liquid there. Whatever the case may be, the cleaning of at least the last part of the main milk pipe 11 is insufficient in this case. Therefore, with the cleaning operation according to FIG. 2b, additional cleaning liquid is supplied at the pressurized liquid supply 15 after it has been found that the cleaning operation was insufficient, in such a way that now, at time $t_1$, the minimum temperature $T_{min}$ is reached and is exceeded for the minimum desired time $t_M$, in this case until time $t_2$. It should be noted that the total time period is now clearly longer than according to the normal cleaning procedure illustrated in FIG. 2a. In order to compensate for this, it is possible to already supply additional heated cleaning liquid via the pressurized liquid supply 15 in a subsequent cleaning cycle from the start of the cleaning cycle. Not only does this shorten the total cleaning cycle, but it also means that less additional cleaning liquid is required as a result of the combined heat content. This is shown in FIG. 2c.

The solid line in FIG. 2c shows the cleaning operation according to the normal cycle, as illustrated in the first part of the diagram of FIG. 2b. As can be seen, the minimum temperature $T_{min}$ is not reached in this case either. However, by already supplying the additional cleaning liquid from the start of the cleaning cycle $t_0$, the temperature profile according to the dashed line is reached, wherein time $t_1$ the minimum temperature $T_{min}$ is reached which does not fall below the latter until time $t_2$. Since time $t_2$ is after the minimum required time $t_1$ plus $t_M$, it is in addition possible to reduce the amount and/or the temperature of the additional heated cleaning liquid, as long as the required cleaning criterion is satisfied. All this may be determined in a dynamic way by reducing said variables amount and temperature of the additional cleaning liquid until the criterion is only just satisfied. All this may be determined in a dynamic way, for example also partly based on ambient variables, such as temperature, wind speed, etc. A significant advantage of the present invention is the fact that only a single additional cleaning device has to be modified and not every individual cleaning device 40 of every milking device 2, 3.

The illustrated embodiments are only intended and given as non-limiting examples. The scope of protection is determined by means of the attached claims.

The invention claimed is:

1. A milking system for use on a dairy farm, wherein the milking system comprises:
   several milking devices, each milking device having a plurality of milking cups and a milk jar;
   a temporary milk storage vessel;
   a milk pipe system connecting the temporary milk storage vessel to each of the several milking devices;
   a milk storage tank;
   a main milk pipe connecting the temporary milk storage vessel to the milk storage tank; and
   a first cleaning device having at least one first cleaning liquid supply and at least a pump, said first cleaning device being configured to clean at least one of the plurality of milking cups and the milk jar of at least one of the several milking devices and a part of the milk pipe system connecting the at least one milking device to the temporary milk storage vessel, by transferring cleaning liquid from the at least one first cleaning liquid supply through at least one of the plurality of milking cups and the milk jar of the at least one milking device and through said part of the milk pipe system to the temporary milk storage vessel by pumping,
   wherein the temporary milk storage vessel comprises a main pump for transferring liquid from the temporary milk storage vessel through the main milk pipe in the direction of the milk storage tank,
   wherein the milking system further comprises a second, additional cleaning device with at least one second, additional cleaning liquid supply, said second cleaning device being configured to supply additional cleaning liquid from the second cleaning liquid supply in a direction of flow from the temporary milk storage vessel towards the main milk pipe without supplying the second liquid to the temporary milk storage vessel, and
   wherein the second cleaning liquid supply is situated downstream of at least each of the several milking devices, viewed in said direction of flow.

2. The milking system as claimed in claim 1, wherein at least one of the at least one second cleaning liquid supply is situated downstream of said milk pipe-system.

3. The milking system as claimed in claim 1, wherein each of the several milking devices has a dedicated first cleaning device or at least a dedicated first cleaning liquid supply.

4. The milking system as claimed in claim 1, wherein the first cleaning device comprises a first heating device for heating cleaning liquid to be supplied via the first cleaning liquid supply, and wherein the second cleaning device comprises a second, additional heating device for heating cleaning liquid to be supplied via the second cleaning liquid supply.

5. The milking system as claimed in claim 1, further comprising a monitoring device configured to monitor a cleaning criterion and to generate a control signal based on the monitoring of the cleaning criterion, and
   wherein the second cleaning device comprises a control unit operatively connected to the monitoring device and configured to control the second cleaning device on the basis of the control signal.

6. The milking system as claimed in claim 5, wherein the monitoring device comprises a temperature gauge configured to repeatedly measure a temperature of liquid in the main milk pipe.

7. The milking system as claimed in claim 6, wherein the cleaning criterion comprises that the measured temperature is above a predetermined threshold value for at least a predetermined time period.

8. The milking system as claimed in claim 6, wherein the control unit is configured to supply, by means of the second cleaning device, additional cleaning liquid in an amount and/or at a temperature which is/are dependent on said measured temperature, during a preceding cleaning action.

9. A method for cleaning a milking system on a dairy farm, wherein the milking system comprises:
   several milking devices, each milking device having a plurality of milking cups and a milk jar;
   a temporary milk storage vessel connected to each of the several milking devices by a milk pipe system; and
   a milk storage tank connected to the temporary milk storage vessel by a main milk pipe, wherein the method comprises the steps of:
   supplying a first cleaning liquid to and through at least one of the several milking devices, including at least one of the plurality of milking cups and the milk jar of the at least one milking device and at least a part of the milk pipe system;
   pumping the first cleaning liquid into the temporary milk storage vessel by one or more pumps; and
   supplying a second, additional cleaning liquid to the milking system, substantially downstream of each of the milking devices without supplying the second cleaning liquid to the temporary milk storage vessel.

10. The method as claimed in claim 9, further comprising the step of measuring a value of a property of at least the first cleaning liquid, wherein the supply of the second additional cleaning liquid takes place according to a criterion in connection with the measured value.

11. The method as claimed in claim 10, wherein the criterion comprises that the measured value reaches a predetermined threshold value, during a predetermined, uninterrupted, time period.

12. The method as claimed in claim 11, wherein the property comprises a temperature of at least the first cleaning liquid.

13. The method as claimed in claim 11, wherein the second cleaning liquid is supplied in such an amount and/or at such a temperature that the criterion is met for the combination of the first cleaning liquid and the second cleaning liquid.

14. The method as claimed in claim 13, further comprising the step of performing a cleaning cycle repeatedly but with, in each case, an interval,
- wherein the cleaning cycle comprises the step of supplying the first cleaning liquid through at least one of the several milking devices, and the optional supply of the second cleaning liquid, and
- wherein the amount and/or temperature of the second cleaning liquid to be supplied during the cleaning cycle is determined by the measured values during a preceding cleaning cycle.

15. The milking system as claimed in claim 1, wherein at least one of the at least one second cleaning liquid supply is situated downstream of said milk pipe system, in the main milk pipe, downstream of the temporary milk storage vessel.

16. The milking system as claimed in claim 5, wherein the monitoring device comprises a temperature gauge configured to repeatedly measure a temperature of liquid in the main milk pipe near the milk storage tank.

17. The method as claimed in claim 9, further comprising the step of measuring a value of a property of at least the first cleaning liquid, near a connection between the main milk pipe and the milk storage tank, wherein the supply of the second additional cleaning liquid takes place according to a criterion in connection with the measured value.

18. The milking system as claimed in claim 2, wherein each of the several milking devices has a dedicated first cleaning device or at least a dedicated first cleaning liquid supply.

19. The milking system as claimed in claim 1, further comprising a temperature sensor provided between the temporary storage tank and the milk storage tank.

20. The method as claimed in claim 9, further comprising a temperature sensor provided between the temporary storage tank and the milk storage tank.

* * * * *